(12) United States Patent
Rathunde et al.

(10) Patent No.: US 8,041,996 B2
(45) Date of Patent: Oct. 18, 2011

(54) METHOD AND APPARATUS FOR TIME-BASED EVENT CORRELATION

(75) Inventors: Dale Rathunde, Geneva, IL (US); Deepak Elandassery, Naperville, IL (US); William E. Barker, Geneva, IL (US)

(73) Assignee: Alcatel Lucent, Paris (FR)

( * ) Notice: Subject to any disclaimer, the term of this patent is extended or adjusted under 35 U.S.C. 154(b) by 350 days.

(21) Appl. No.: 11/972,737

(22) Filed: Jan. 11, 2008

(65) Prior Publication Data

US 2009/0183023 A1   Jul. 16, 2009

(51) Int. Cl.
G06F 11/00 (2006.01)

(52) U.S. Cl. ............................................ 714/26; 714/37
(58) Field of Classification Search .................... 714/25, 714/26, 37, 40, 48
See application file for complete search history.

(56) References Cited

U.S. PATENT DOCUMENTS

| | | | | |
|---|---|---|---|---|
| 5,748,098 A | * | 5/1998 | Grace | 370/242 |
| 6,415,395 B1 | * | 7/2002 | Varma et al. | 714/37 |
| 6,615,367 B1 | * | 9/2003 | Unkle et al. | 714/26 |
| 6,966,015 B2 | * | 11/2005 | Steinberg et al. | 714/47 |
| 7,213,179 B2 | * | 5/2007 | Song et al | 714/48 |
| 7,257,744 B2 | * | 8/2007 | Sabet et al. | 714/56 |
| 7,398,511 B2 | * | 7/2008 | El-Shimi et al. | 717/104 |
| 7,434,109 B1 | * | 10/2008 | Stabile et al. | 714/47 |
| 7,590,701 B2 | * | 9/2009 | Panec et al. | 709/207 |
| 2002/0073195 A1 | * | 6/2002 | Hellerstein et al. | 709/224 |
| 2004/0054801 A1 | * | 3/2004 | Kawasaki et al. | 709/231 |
| 2007/0005806 A1 | * | 1/2007 | Fitzgibbon et al. | 709/246 |

* cited by examiner

*Primary Examiner* — Joshua Lohn
(74) *Attorney, Agent, or Firm* — Fay Sharpe LLP (57) ABSTRACT

A method and apparatus for fault analysis and fault isolation in a system of networked processors by using a central event correlation function and logical fault signature to provide for fault isolation of failed processing elements is presented. This central event correlation method uses asynchronous events from multiple input sources of same and different technologies and time-based fault correlation and ageing to match unique fault signatures and determine levels of fault recovery escalation over time. This mechanism uses an event driven recovery table to recognize a unique fault signature, count and age faults, provide fault threshold based recovery and generate events as needed to drive recovery escalation.

20 Claims, 4 Drawing Sheets

METHOD AND APPARATUS FOR TIME-BASED EVENT CORRELATION

BACKGROUND OF THE INVENTION

This invention relates to a method and apparatus for time-based event correlation using logical event triggers for fault management of distributed processing elements. While the invention is particularly directed to the art of telecommunications, and will be thus described with specific reference thereto, it will be appreciated that the invention may have usefulness in other fields and applications.

By way of background, a major contribution to unplanned downtime in the field of telecommunications is lack of fault coverage. The ability to isolate and recover faults is a customer need and a major differentiator in the market. While standards address interfaces, they do not address implementation. As MSC-based and ISP-based networks evolve, elimination of unplanned downtime will be required. Integration of third party hardware and software will increase to drive costs down. The need to perform event driven fault management between such commercial elements in a running system is essential to meet the unplanned downtime needs of the end user.

Previously, platforms used single fault events to alarm a fault and control the recovery on a processing element. This was first applied at the chassis system level or in a host processor in the chassis where faults can be received, typically via a heartbeat mechanism or over a bus on the backplane. This approach relies on a single input event to determine a fault. The event itself can be part of a fault. Prior art modified this by having a single central function collect, count and threshold events to perform recovery. These approaches do not use an event correlation window (time-based window) nor do they allow for parallel time-based event correlation functions to determine the appropriate fault isolation and recovery of components in the system. This is due to the prior art not separating fault detection time needed to trigger application recovery from the time needed for fault isolation, alarming and self-healing (auto repair) operations in the same system.

What is needed, therefore, are event correlation functions that utilize an event correlation window to collect and analyze a larger set of input events over a time period (from multiple sources) to perform fault isolation and self-healing (auto repair) in the system to maximize system availability.

SUMMARY OF THE INVENTION

A method and apparatus for time-based event correlation using logical event triggers for fault management of distributed processing elements are provided.

In one aspect of the invention, a method of analyzing and isolating faults in a system of networked processors is provided. The method comprises: monitoring a plurality of resources in the system via a corresponding resource monitoring software; receiving an input event from the resource monitoring software, wherein each input event has attributes associated with it that defines the handling of the input event; using time-based event correlation to determine a unique logical event trigger at the end of an event correlation window; performing a set of event correlation functions and using a logical fault signature that represents one or more input events to determine the appropriate action based on the unique logical event trigger; and performing the appropriate action on the resource.

In another aspect of the invention, an event correlation apparatus for analyzing and isolating faults in a system of networked processors is provided. The apparatus comprises: a set of independent front-end monitors for monitoring resources in the system; and a set of back-end components that provide for fault analysis, fault isolation via event correlation, and resource management via an event driven recovery table or an alarm/state table.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the apparatus, and steps of the method, whereby the objects contemplated are attained as hereinafter more fully set forth, specifically pointed out in the claims, and illustrated in the accompanying drawings in which:

DETAILED DESCRIPTION

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

Figure 1:
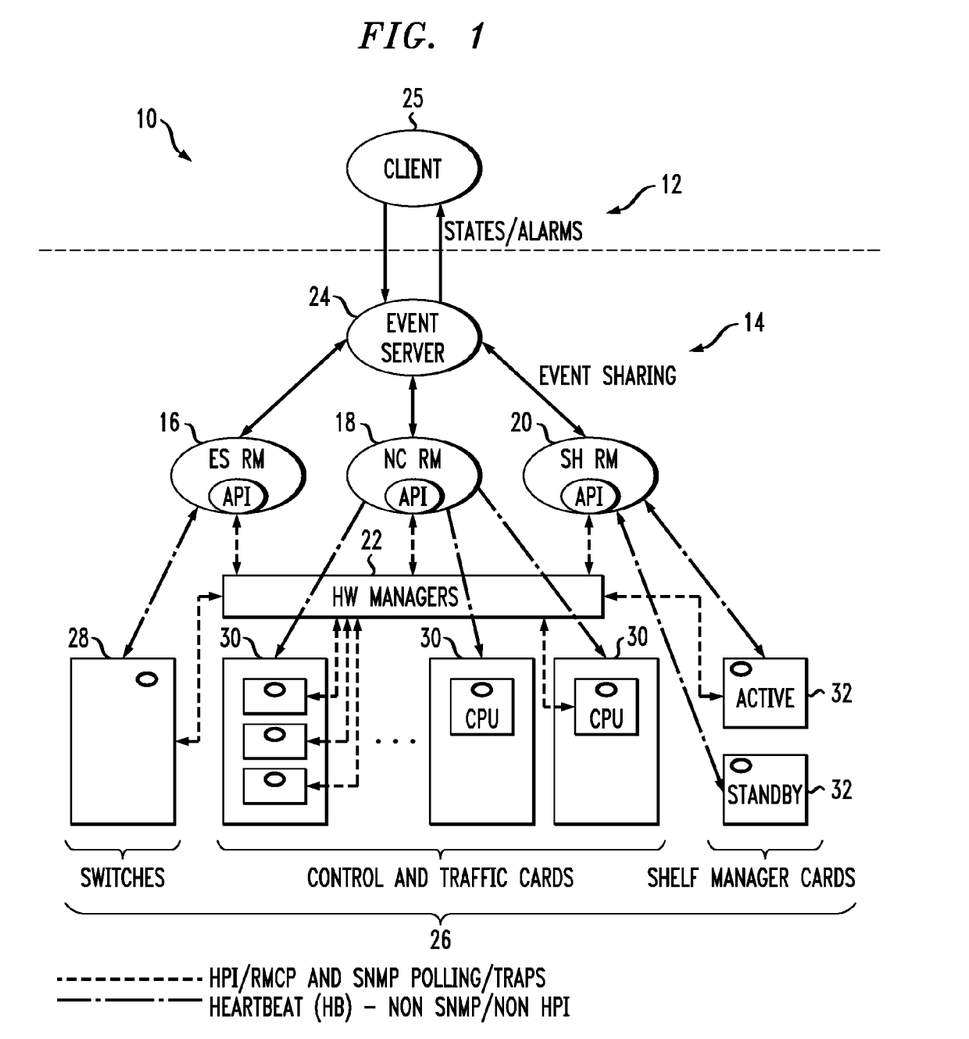
FIG. 1 is a block diagram illustrating a system suitable for implementing the present invention.

Referring now to the drawings wherein the showings are for purposes of illustrating the exemplary embodiments only and not for purposes of limiting the claimed subject matter, FIG. 1 provides a view of a system 10 into which the presently described embodiments may be incorporated. As shown generally, the system 10 of FIG. 1 may be divided into at least two components—an application services component 12 and a fault isolation services component 14. FIG. 1 further illustrates the use of at least three resource monitors—an Ethernet switch resource monitor (ES RM) 16, a node card resource monitor (NC RM) 18, and a shelf resource monitor (SH RM) 20—for performing event correlation and recovery in parallel based on input events forwarded by at least one lower level hardware manager 22. The hardware managers 22 can use standard interfaces, such as SNMP, HPI and SMART (self-monitoring analysis and reporting technology), to interface and receive events related to hardware components. The resource monitors can also use independent monitoring or messaging with the resources. An event server 24 is used to share events (e.g., state changes and alarms) between the resource monitors to allow for additional input event correlation from other software in the system (including application software). A client/customer 25 exchanges state/alarm changes with the event server 24. Resources 26 include, for example, any number of switches 28, control and traffic cards 30, and shelf manager cards 32. Other types of resources include processors and ports in the context of monitoring Ethernet switch resources, node cards, I/O cards and other processing resources. These are dependent resources that are part of the larger/containing resource but need individual monitoring, alarming and recovery. However, the invention is not limited to just these resources. That is, the resources 26 may comprise "any hardware equipment" or even "software abstractions" implemented by programs on that hardware. Accordingly, resources can include software processes, operating system features, databases, file systems, memory, or even routing hardware/software functions.

It is to be understood that the exemplary embodiments of the invention may be used to support the development of wireless networks using cPCI, CPSB, ATCA, MicroTCA, and other next generation platforms. These embodiments are intended to apply to IP over Ethernet, ATM, T1, WiMAX, etc.

Figure 2:
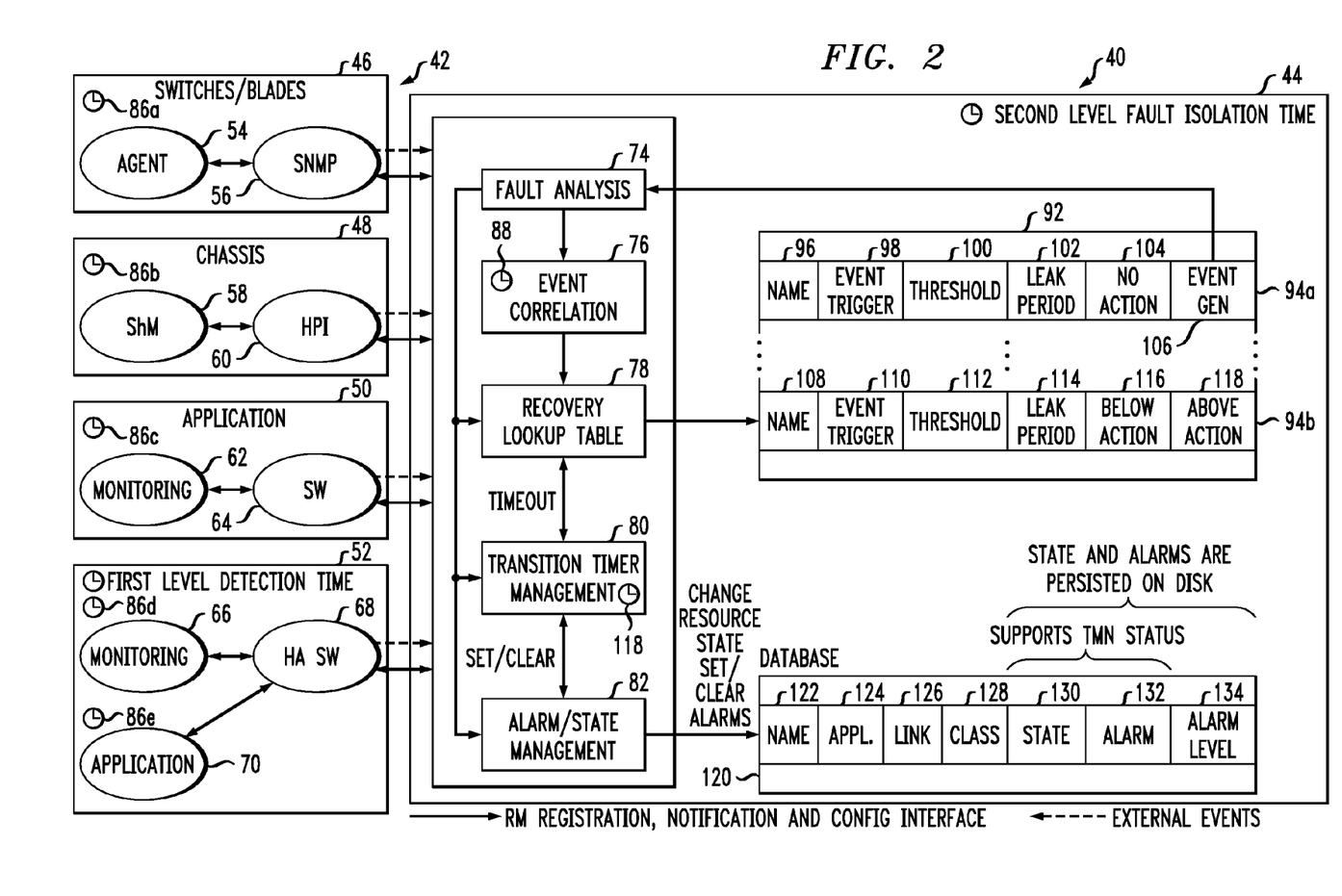
FIG. 2 is a block diagram illustrating the resource monitor event correlation software components.

As shown in FIG. 2, the event correlation software 40 is generally comprised of a set of independent front-end components 42 that provide the appropriate monitoring for a resource and a set of back-end components 44 that provide for the fault analysis, fault isolation via event correlation, and resource recovery via an event driven recovery table and Alarm/State Management, as explained more fully below.

The method for event correlation supports resource monitoring (can be done by hardware and/or software) as a separate function from the resource monitor event correlation software.

The resource monitoring at the front end 42 performs the monitoring function for external hardware and/or software resources. The monitoring can be one or more detection mechanisms to determine a resource operating failure and generate events. The monitoring mechanisms can be independent of the resource monitor event correlation software. When a front-end resource monitoring software 42 determines a resource is failing it issues a notification message with content indicating a reason for the event. These notification messages are propagated via a supported transport to the back-end resource monitor event correlation software 44 (to be used as part of fault analysis and isolation).

The resource monitor event correlation software 44 is independent of the operating system on the resource and monitoring method (or technology) used to monitor a resource. This allows for easier integration of different front-end resource monitoring software 42 with the back-end resource monitor event correlation software 44.

As shown in FIG. 2, the resource monitoring may involve the switches/blades 46, the chassis 48, an application 50, and high availability (HA) functions 52. The switches/blades 46 include an agent 54 communicating via SNMP 56. The chassis 48 includes a shelf manager 58 communicating via HPI 60. The application 50 includes resource monitoring 62 and software 64 and communicates via proprietary or standard APIs. The high availability function 52 includes resource monitoring 66 and high availability software 68 and communicates via proprietary or standard APIs. Application software 70 can be monitored by HA SW 68, which reports notification messages related to application operational status.

The resource monitor event correlation software 44 is generally comprised of a set of event correlation functions 72 that includes a Fault Analysis function 74, an Event Correlation function 76, an Event Driven Recovery Lookup function 78, a Transition Timer Management function 80 and an Alarm/State Management function 82.

The resource monitor event correlation software 44 determines if an input event is an indicator of a potential fault for a resource it is responsible for. All known input events supported by a resource monitor will have an attribute that indicates if the input event is a fault indicator for a given resource. An input event can be an external input event received from any monitoring software in the system or an internal input event from a recovery action in the resource monitor's event driven recovery table. To that end, the front end 42 as shown in FIG. 2 includes a series of configurable timers 86a, 86b, 86c, 86d, 86e, which represent the time it takes for the respective front end monitoring software to detect a failure. Thus, for example, the first timer 86a could be set to 5 seconds, 10 seconds, 20 seconds, or even 0 seconds.

The resource monitor event correlation software 44 determines if an input event requires event correlation. If the input event is externally generated it may or may not be correlated depending on the event. If the input event is internally generated it may or may not be correlated depending on the event. Input events are maintained in an event repository. For the first input event that is a fault indicator and requires event correlation on a resource, a timing window 88 is set for a configurable number of seconds to allow the corresponding resource monitor to correlate input events that are received during that correlation window. Previous input events that were fault indicators that are still outstanding remain in an event repository and are also used during event correlation. This timing window for event correlation can be a configurable interval for all event correlation windows or it can be dynamic, based on the first event received.

This event correlation introduces the second level of detection time necessary to isolate the fault (88). At the end of the event correlation window 88, a single unique event trigger (or "fault signature") is defined and is supported in a row in the resource monitors event driven recovery table. This is a logical event type that represents one or more input events (from one or more sources) received during the event correlation window or recorded from a previous event correlation that has not been cleared. A unique event trigger defines a fault in the system. And what is not reported is also significant for event correlation purposes.

A recovery table 92 includes unique recovery table rows 94a, 94b, etc. for each unique event trigger for each unique resource type. The resource monitor event correlation software 44 will determine if the resource automatic recovery is allowed or inhibited for the resource. The allow/inhibit function is set by the application and is used in rows that actually do recovery. For example, one row (94a) may include name data 96, event trigger data 98, threshold data 100, leak period data 102, "no action" data 104 indicating that the event does not require recovery action, and event generation data 106 to generate an internal input event. Another row (96a) may include name data 108, event trigger data 110, threshold data 112, leak period data 114, "below threshold recovery action" data 116, and "above threshold recovery action" data 118.

The resource monitor software will look up the event trigger in the recovery table 92. The key here is that the recovery table 92 may have rows that help determine fault isolation. If a leak period has been specified for an event trigger in the recovery table 92, this software will first decrement the event trigger count based on the number of leak periods reached since the last recorded event trigger was received for that resource. This approach is used to age (decrement over time) and automatically clear trigger counts. The resource monitor software will then increment the event trigger count for that resource and use a threshold approach to determine appropriate recovery escalation given the type of event trigger and its frequency. There is a "below" recovery action and an "above" recovery action based on whether the count has exceeded the threshold or not.

It should be noted that input events can also be generated by transition timing software (e.g., software that manages transition timers during resource booting/initialization, transition in and out of maintenance mode, fault recovery as well as when manual recovery is requested on a resource). If a transition timer 119 expires, a transition timeout input event is generated.

To accomplish the Alarm/State Management function 82, data is stored in a database 120. The stored data may include name data 122, application data 124, link data 126, class data 128, state data 130, alarm data 132, and alarm level data 134. It should be appreciated that state/alarm data can be persisted on secondary storage (216) to be available to the resource monitor software during initialization and can be used to determine last known operating state and/or for auditing the system.

The resource monitor software is responsible for fault isolation, changing the state and setting alarms on a resource based on event triggers related to its resources and/or other resources in the system. For example, the resource monitor does enough correlation to determine that a particular resource is the source of a fault and therefore the resource is alarmed and possibly its state changed.

Given the nature of resource monitors that react to input events provided from multiple sources, the resource monitors event driven recovery table can be easily changed or enhanced as more events and recovery actions are added. The input event approach can allow application software to inject events that drive fault recovery scenarios (e.g., for application detected faults). Thus, each event trigger that needs recovery is handled by a resource monitor and must have an entry in this recovery table 92 since the recovery table is where the isolation, escalation and recovery strategy is maintained. Note that this is not the same as saying all events are in the recovery table (e.g., if the input event received is not an indicator of a fault it does not need to correspond to an event trigger in the recovery table). Such an approach simplifies the addition of new events and could also reduce the amount of testing needed when new events are added (preserving the previous entries and associated recovery actions).

The event driven recovery table 92 is part of the central resource monitor event correlation function 44 and not part of the software components placed on the resource itself. This is due to the importance of the centralized monitoring functions at the system level and the simplicity and role of the component being placed on the end resource.

To summarize, the basic functions of the event driven architecture include:
identifying events for each resource monitored,
defining one event trigger per row (unique fault signature),
matching unique event triggers (generated from one or more sources),
having the same event trigger go thru the same code,
tracking each event trigger (increment count),
leaking the bucket (decrement count),
tracking time of last event trigger,
allowing for recovery actions below and at/above defined recovery threshold,
invoking the specified recovery action, and
alarm and state change for a resource.

In this table driven model, event triggers could have no recovery action or call the same recovery action. Recovery actions can generate internal events to drive another recovery action in the table. It is important to note that the below and above threshold recovery approach can provide levels of recovery escalation. The above threshold allows for more aggressive recovery (if needed). It also allows for redirection to another row in the table. For example, when above event count threshold is reached, a new internal event can be generated. The below-threshold for this new internal event trigger is de facto the above-threshold recovery action for the original fault that generated the new event. This can be done multiple times depending on the level of recovery escalation needed. If the threshold value for a given event trigger is set to 1, there is no difference between the below and above threshold recovery action, so the below threshold recovery is simply not used.

Figure 3:
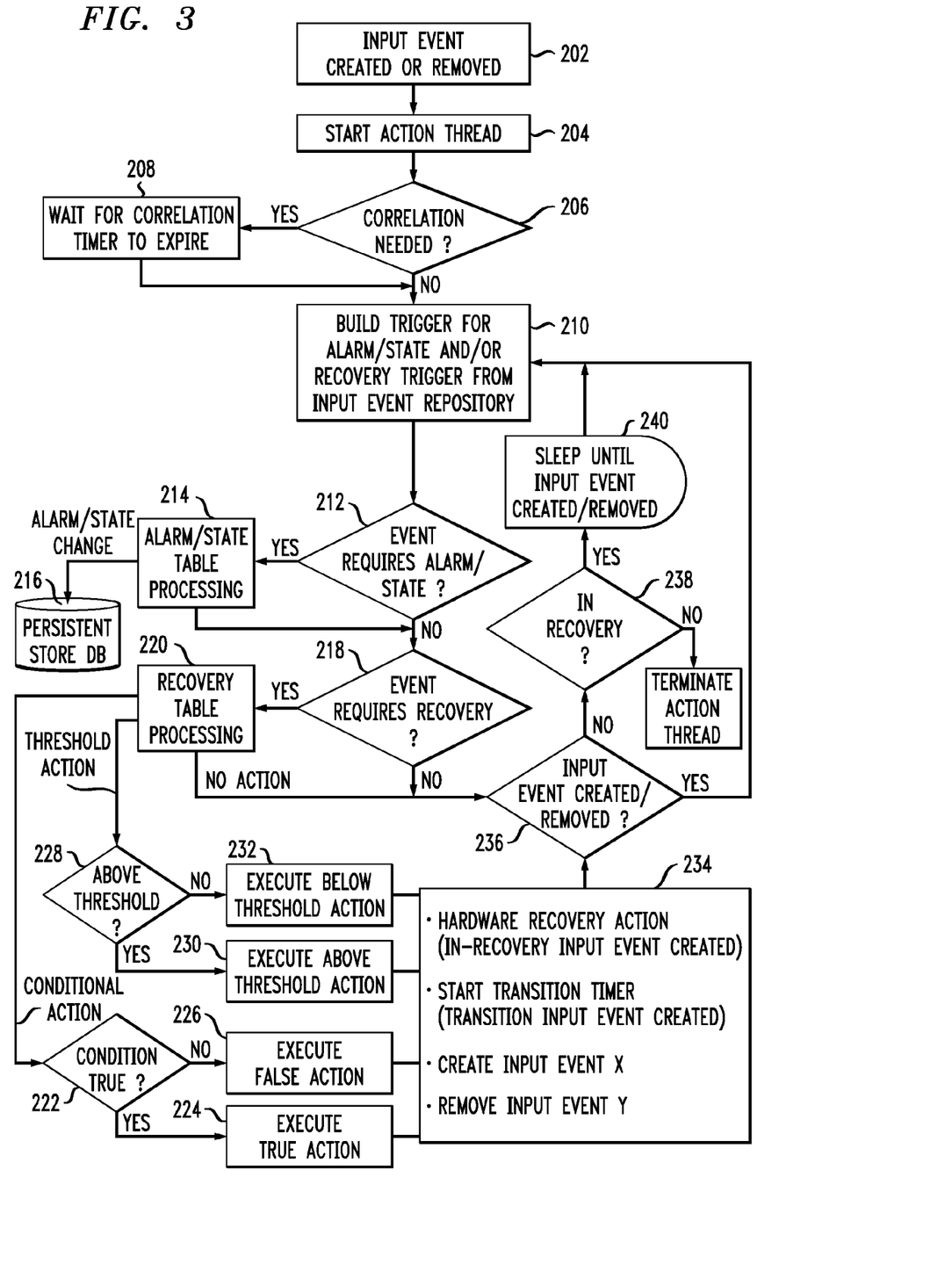
FIG. 3 is a flow chart illustrating an exemplary method of time-based event correlation.

We turn now to FIG. 3, which shows a flow chart of an exemplary time-based event correlation method. In order to support the translation of an externally generated event into an input event that the resource monitor event correlation software can recognize, Event Listeners are used. Event Listeners are specific to the external resource being monitored, and understand the communication mechanism and protocol necessary to collect events from the external resource. The Event Listener understands how to interpret the external event and knows how to map the external event into an add/remove input event in the event repository.

Input events have attributes associated with them that define the handling of the input event when the input event is added to or removed from the event repository. For example, some input events require correlation (that is, the input event by itself does not define a fault, but may contribute to the definition of a fault when correlated with other input events). Some input events do not require correlation. Another example of an input event attribute is whether it contributes to an alarm/state event trigger, and/or whether it contributes to a resource recovery event trigger. Note that most of the time the event triggers will be identical for alarm/state and recovery processing, but in the implementation we allowed them to be different, which allows for processing of only alarm/state changes (e.g., clear an alarm).

Thus, initially an input event is created or removed (202). The addition of the first event into the event repository for a resource triggers the creation of an Action Thread (204). The dynamic Action Thread provides an execution environment for the resource monitor event correlation software functions available, which in this case include Fault Analysis 74, Event Correlation 76, Event Driven Recovery Table processing 78, Transition Timer Management 80, and Alarm/State Management 82.

When an input event is added to the event repository, the input event's attributes are checked (206). If the input event requires correlation, then the correlation timer 88 is started. While the correlation timer 88 is running, other input events may be added to and/or removed from the event repository, but no other processing occurs until the correlation timer expires.

Once the correlation timer 88 expires (or, if no correlation was needed) (208), the event repository is searched for all input events that contribute to an alarm/state event trigger (210). If there are any such input events, the logical event trigger is formed. This logical event trigger is passed to a processing function such as the Alarm/State Management function 82.

Each row of the Alarm/State Management table represents a particular fault that is to be alarmed or result in a state change on the resource. The event trigger (which represents a list of current input events from the event repository) is compared against the event selectors defined for a particular event processing table such as the Alarm/State Management table row (212). Event Selectors are a defined set of input events that must be present in order to match a row, which defines a fault (event selectors can be statically-defined or dynamically loaded policies). If there is a match, the Alarm/State Management function executes all of the actions defined for the particular row in the Alarm/State Management table (214). The actions are a defined set of operations to be performed on the resource. For example, an action might be to set the resource's state to the TMN values operational:disabled availability:failed. Or, an action might be set an alarm on the resource indicating that it has lost power. For example, the Alarm/State event trigger may match multiple rows (faults) in the Alarm/State Management Table, and all actions for all matched rows are performed (see FIG. 4).

Figure 4:
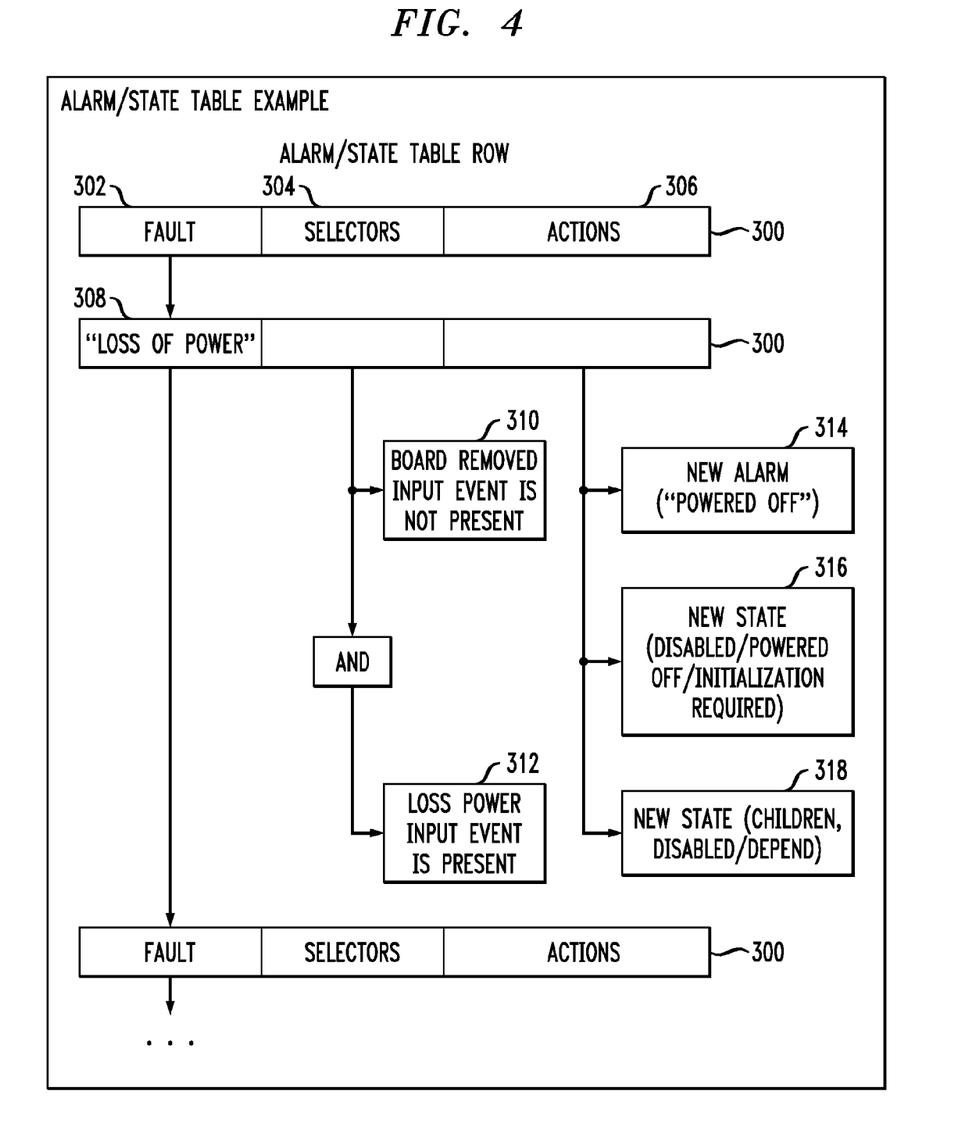
FIG. 4 is an example of an event processing table in accordance with aspects of the present invention.

As shown in FIG. 4, there are any number of Alarm/State Table Rows 300 that include at least three columns—fault 302, selectors 304, and actions 306. In this example, (1) the fault is "loss of power" 308; (2) the selectors include "board-Rmvd input event is not present" 310 and "lossPower input event is present" 312; and (3) the actions include "NewAlarm" (powered off) 314, "NewState" (disabled/powered off/initialization required) 316, and "NewState" (children/disabled/depend) 318. Further, it should be appreciated that the actions can be software implementation that supports any state and alarm definition such as CCITT recommended for X.731 (State Management Function) and X.733 Alarm Reporting Function. Such actions can be applied to a resource or a dependent (child) resource of a unit in the system.

Similar to the Alarm/State Management event table processing function, the Event Driven Recovery function is performed if no match is found (218). Of course, it can be appreciated that these two event table processing functions can be performed in either order. The event repository search may have to identify input events that contribute to Recovery. If there are any such input events, the logical event trigger is formed, and this logical event trigger is passed to the Event Driven Recovery function.

As with the Alarm/State table, each row of the Event Driven Recovery table represents a particular fault that is to trigger actions (see FIG. 4). The event trigger is compared against the defined event selectors defined for the particular Event Driven Recovery table row (event selectors can be statically defined or dynamically loaded) (218). If there is a match, the Event Driven Recovery function executes all of the actions defined for the particular row (220). In this regard, there are at least three possibilities to consider: "conditional" action, "threshold" action, and no action. For conditional actions, it is to be determined whether the condition is "true" or "false" (222). If so, then the "true" action is executed (224). Otherwise, the "false" action is executed (226). For threshold actions, it is to be determined whether the event is above or below the threshold (228). If so, then the above threshold action is executed (230). Otherwise, the below threshold action is executed (232). Some examples (234) of possible "recovery" actions include:

threshold the occurrences of the fault and perform actions based on whether the occurrences are below or above a threshold;
implement a leaky bucket on the occurrences;
start a transition timer to track expected (state) changes in the resource;
power-down the resource;
create an "internal" input event (which is used in the next pass to form the new event trigger, which can then match other alarm/state and/or recovery rows); and
check for a certain condition being present and perform a specific action if the condition is present, or is not present.

Next, determine whether an input/event has been created or removed (236). If so, then take another pass through the Alarm/State Management and/or Event Driven Recovery functions. Otherwise, determine whether the resource is in recovery (238). Once the Alarm/State Management and Event Driven Recovery functions have been performed, the action thread will sleep, waiting for other input events to be added or removed from the event repository (240), which will again trigger another pass through the Alarm/State Management and/or Event Driven Recovery functions. While the resource is undergoing recovery, the action thread is maintained for efficiency sake and multiple passes through the Alarm/State Management function and the Event Driven Recovery function are performed as input events come and go. When the resource is no longer in recovery, the action thread is terminated (242), only to be started again when the next input event is added to the event repository. See FIG. 4—event processing.

In summary, this mechanism allows for event distribution across multiple event correlation engines to exist in the same system with each monitoring its own set of hardware, software components and/or network elements. In this way, a given event correlation function can identify failures that pertain to its set of components without adversely impacting other monitoring functions that are performing fault analysis.

In the preferred embodiment, each processor running a central event correlation function communicates over standard IP interfaces to hardware and software components being monitored (e.g., using SNMP, TCP/IP, UDP/IP, RMCP, etc.) in the same system. Monitored components can have local fault monitoring capabilities that can report directly or indirectly to the event correlation functions. Application software (on the central server or on the target resource) can provide events into the central event correlation functions. General switches and/or routers are connected to allow for message passing between processors on the same network. High Availability software on the server processors running the central event correlation software is used for redundancy and is allowed to communicate with other processors in the same system.

Multiple central event correlation functions can co-exist for monitoring internal and external hardware and/or software components in a system including but not limited to: control and user (traffic) plane cards, fabric switching cards (e.g., Ethernet, Fiber Channel, Infinity Band, etc,), chassis management cards (e.g., standard HPI Shelf Managers in ATCA systems), internal/external disk drives, I/O cards, etc. This approach enables error/fault analysis to be performed using distributed events from multiple sources while allowing a given event correlation function to have responsibility for recovery (e.g., restart, reboot, reset, power cycle, power down, switchover, port up/down, etc) of its set of hardware and/or software components in the system.

This fault management and fault isolation method can be applied in systems with time-share and real-time operating systems, commercial processors, embedded processors, commercial chassis systems (single and multiple shelf), as well as high availability and clustered solutions and other client-server architectures interconnected with commercial switches. This method is generic in nature and can be part of high availability software, system management software, geo-redundancy IP networks, or operating system software as the industry evolves.

The present invention relates to platforms designed to support network services, including but not limited to call processing and radio control software, particularly, UMTS, 1xCDMA, 1xEV-DO, GSM, WiMAX, LTE, UMB, etc. software dispersed over several mobility application processors in the wireless access network architecture. It can also relate to base station controller software for wireless networks.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of analyzing and isolating faults in a system of networked processors, the method comprising:
    monitoring a plurality of resources in the system via a corresponding resource monitoring software;
    receiving at a centralized event correlation module an input event from the resource monitoring software, wherein each input event has attributes associated with it that defines the handling of the input event;
    using time-based event correlation to determine a unique logical event trigger at the end of an event correlation window;
    performing a set of event correlation functions and using a logical fault signature that represents one or more input events to determine the appropriate action based on the unique logical event trigger, wherein the set of event correlation functions comprises event driven recovery table processing; and
    performing the appropriate action on the resource according to levels of recovery escalation, wherein the appropriate action is based on whether occurrences of the logical event trigger are below or above a threshold.

2. The method of claim 1, wherein the set of event correlation functions includes one or more of the following: fault analysis, event correlation, timer management, and alarm/state table processing.

3. The method of claim 1, wherein the event correlation window is triggered by an input event for a given time period to allow the corresponding resource monitor to correlate input events that remain at the end of the event correlation window.

4. The method of claim 1, further comprising:
    storing input events in an event repository.

5. The method of claim 1, wherein all known input events supported by a resource monitor have an attribute that indicates if the input event is a fault event trigger for a given resource.

6. The method of claim 1, wherein all known input events supported by the resource monitoring software have an attribute that indicates if the input event is a state/alarm event trigger for a given resource.

7. The method of claim 1, wherein the centralized event correlation module includes a series of configurable timers that represent the time it takes to detect a failure.

8. The method of claim 1, wherein a recovery table includes unique recovery table rows for each unique event trigger for each unique resource type and the centralized event correlation module determines if automatic recovery is allowed or inhibited for the resource.

9. The method of claim 8, wherein each event trigger that needs recovery is handled by a resource monitor and must have an entry in the recovery table.

10. An event correlation apparatus for analyzing and isolating faults in a system of networked processors, the apparatus comprising:
    an event correlation engine comprising a set of independent front-end monitors for monitoring resources in the system and a set of back-end components that provide for fault analysis, fault isolation via event correlation, and resource management via an event driven recovery table or an alarm/state table, wherein the back-end components further comprise:
    means for receiving an input event from a resource monitoring software, wherein each input event has attributes associated with it that defines the handling of the input event;
    means for using time-based event correlation to determine a unique logical event trigger at the end of an event correlation window;
    means for performing a set of event correlation functions and using a logical fault signature that represents one or more input events to determine the appropriate state change or alarm based on the unique logical event trigger, wherein the set of event correlation functions comprises event driven recovery table processing; and
    means for performing the appropriate state change or alarm actions on the resource according to levels of recovery escalation, wherein the appropriate state change or alarm actions are based on occurrences of the logical event trigger at the end of an event correlation window.

11. The apparatus of claim 10, wherein the set of event correlation functions includes one or more of the following: fault analysis, event correlation, timer management, and alarm/state table processing.

12. The apparatus of claim 10, wherein the event correlation window is set for a given time period to allow the corresponding resource monitor to correlate input events that are received during the event correlation window.

13. The apparatus of claim 10, wherein the set of back-end components further comprises an event repository for storing input events.

14. The apparatus of claim 10, wherein the resources comprise any hardware equipment or software abstractions implemented by programs on that hardware.

15. The apparatus of claim 10, wherein the set of back-end components further comprises a recovery table having unique recovery rows for each unique event trigger for each unique resource type.

16. The apparatus of claim 10, wherein the set of back-end components further comprises an alarm/state table having unique alarm/state rows for each unique event trigger for each unique resource type.

17. The apparatus of claim 10, wherein all known input events from multiple input sources of same and different technologies supported by a resource monitor have an attribute that indicates if the input event is a fault event trigger for a given resource.

18. The apparatus of claim 10, wherein all known input events from multiple input sources of same and different technologies supported by a resource monitor have an attribute that indicates if the input event is a state/alarm event trigger for a given resource.

19. An event correlation apparatus for analyzing and isolating faults in a system of networked processors, the apparatus comprising:
   an event correlation engine comprising a set of independent front-end monitors for monitoring resources in the system and a set of back-end components that provide for fault analysis, fault isolation via event correlation, and resource management via an event driven recovery table or an alarm/state table, wherein the set of back-end components further comprises:
   means for receiving an input event from a resource monitoring software, wherein each input event has attributes associated with it that defines the handling of the input event;
   means for using time-based event correlation to determine a unique logical event trigger at the end of an event correlation window;
   means for performing a set of event correlation functions and using a logical fault signature that represents one or more input events to determine the appropriate recovery action based on the unique logical event trigger, wherein the set of event correlation functions comprises event driven recovery table processing; and
   means for performing the appropriate recovery action on the resource according to levels of recovery escalation, wherein the appropriate action is based on whether occurrences of the logical event trigger are below or above a threshold.

20. A method of analyzing and isolating faults in a system of networked processors, the method comprising:
   monitoring a plurality of resources in the system via a corresponding resource monitoring software;
   receiving at a centralized event correlation module an input event from the resource monitoring software, wherein each input event has attributes associated with it that defines the handling of the input event;
   using time-based event correlation to determine a unique logical event trigger at the end of an event correlation window;
   performing a set of event correlation functions and using a logical fault signature that represents one or more input events to determine the appropriate state change or alarm based on the unique logical event trigger, wherein the set of event correlation functions comprises event driven recovery table processing; and
   performing the appropriate state change or alarm actions on the resource according to levels of recovery escalation, wherein the appropriate state change or alarm actions are based on occurrences of the logical event trigger at the end of an event correlation window.

* * * * *